March 14, 1939.   R. E. PRICE ET AL   2,150,749
FEED MECHANISM
Filed Aug. 6, 1936   5 Sheets-Sheet 2
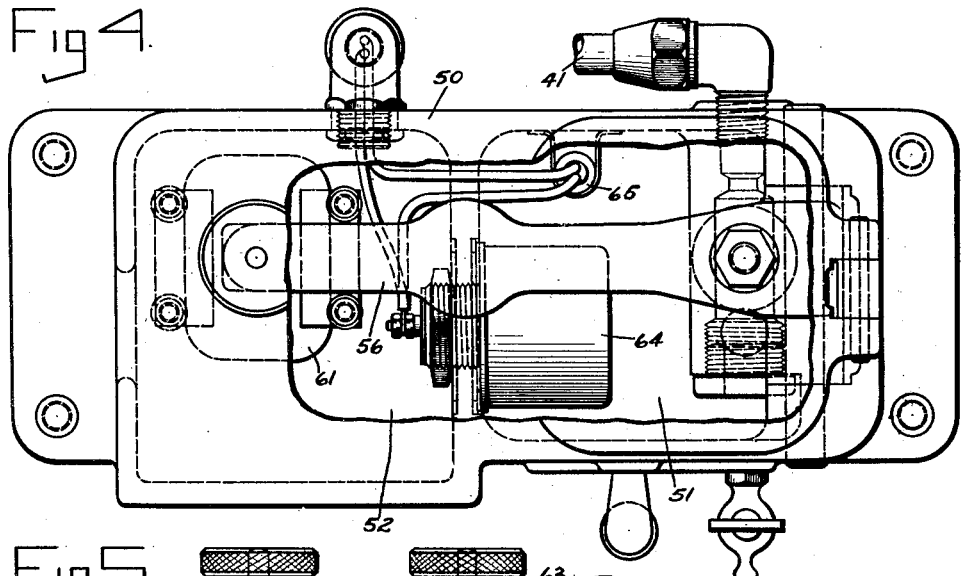
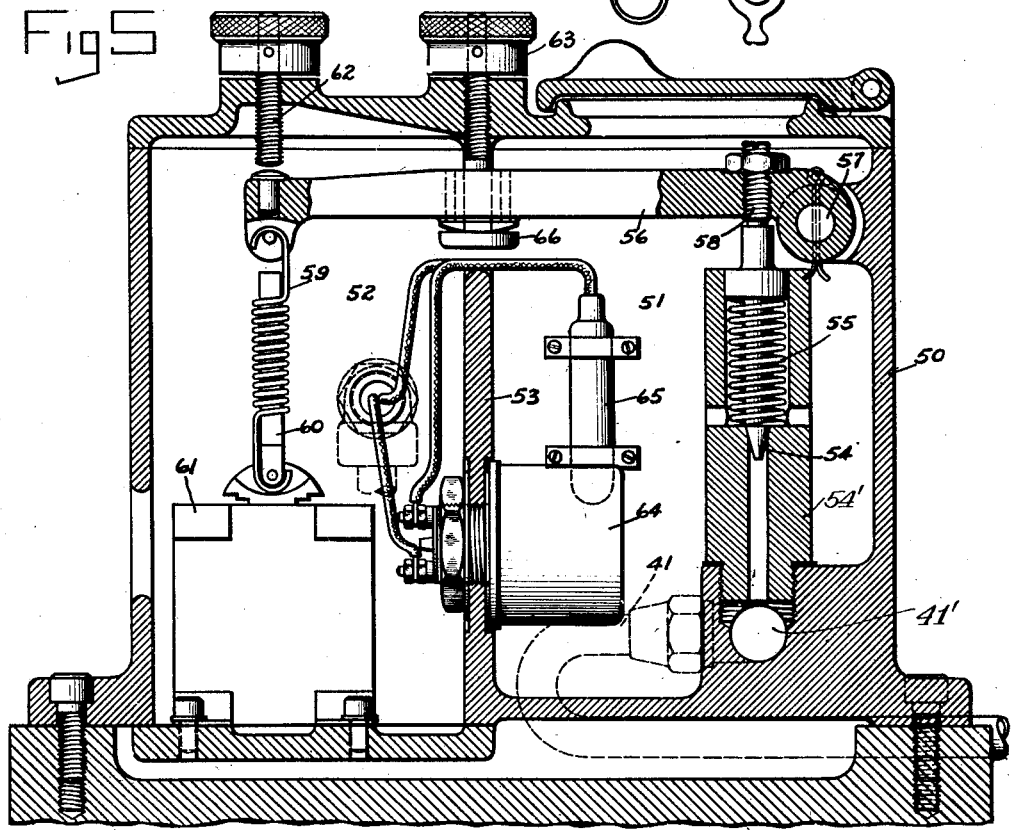
INVENTORS
RALPH E. PRICE
HAROLD E. BALSIGER
CONRAD L. OTT
BY Hugh N. Kocher
ATTORNEY March 14, 1939.  R. E. PRICE ET AL  2,150,749
FEED MECHANISM
Filed Aug. 6, 1936  5 Sheets-Sheet 3
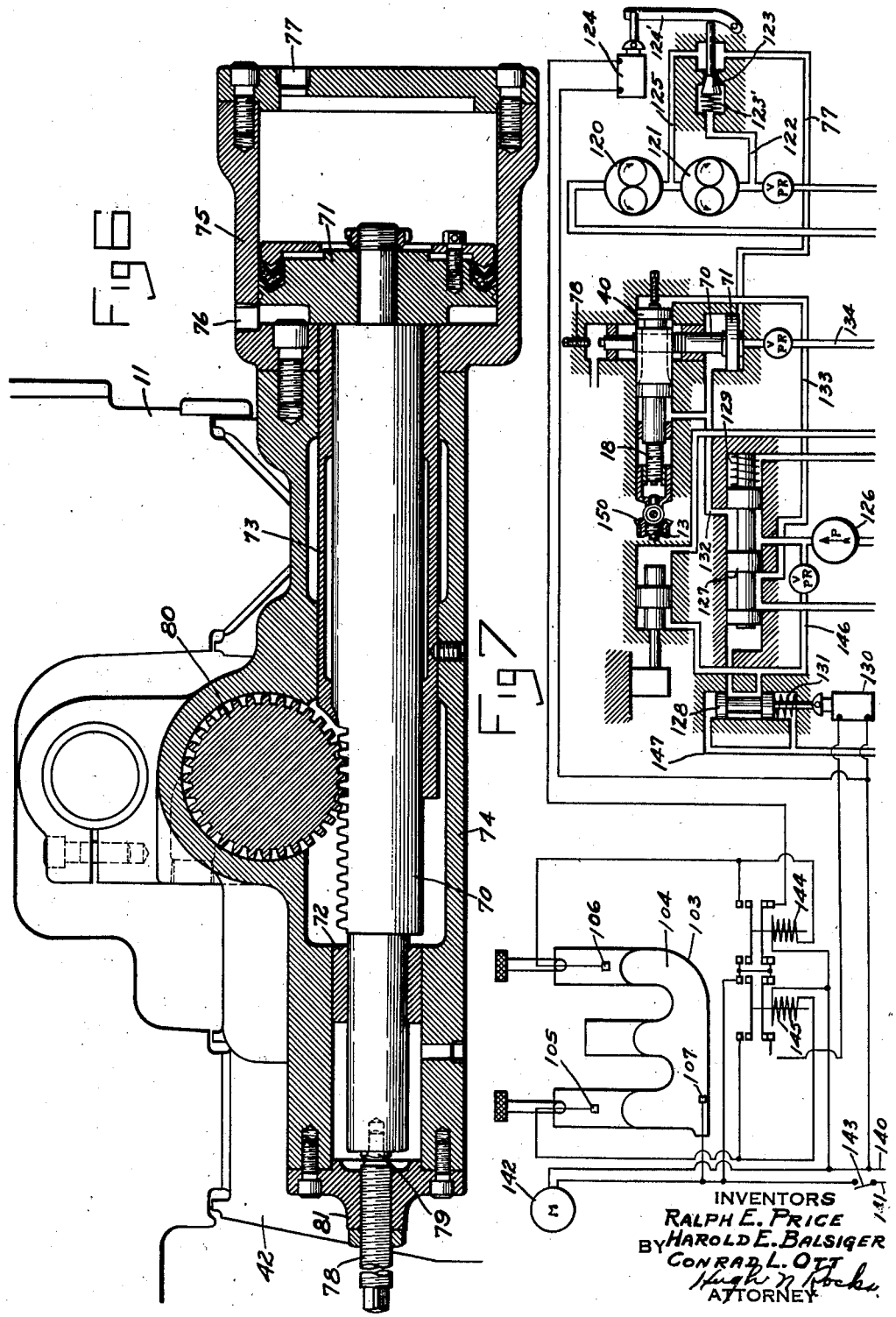
INVENTORS
RALPH E. PRICE
BY HAROLD E. BALSIGER
CONRAD L. OTT
ATTORNEY

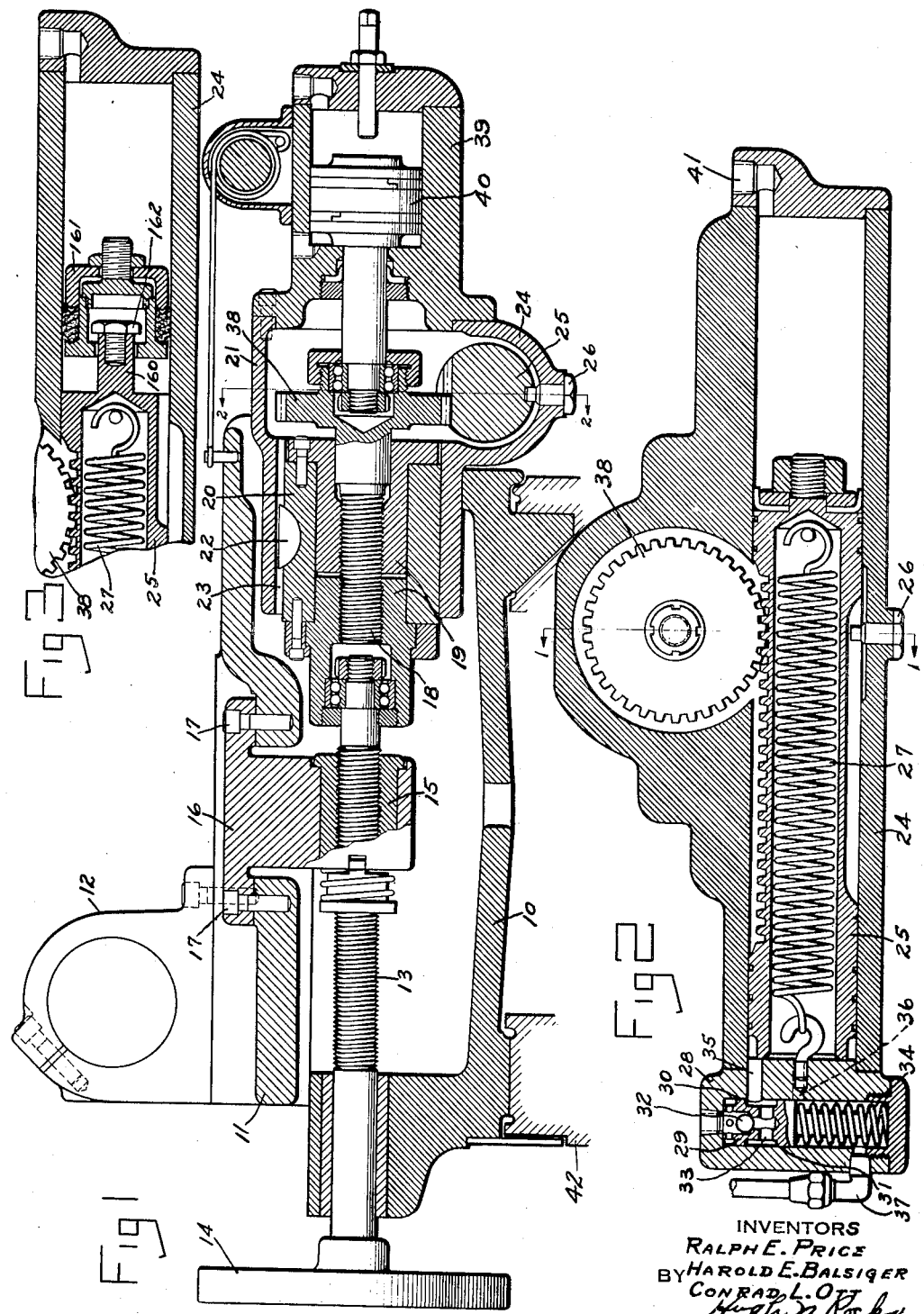

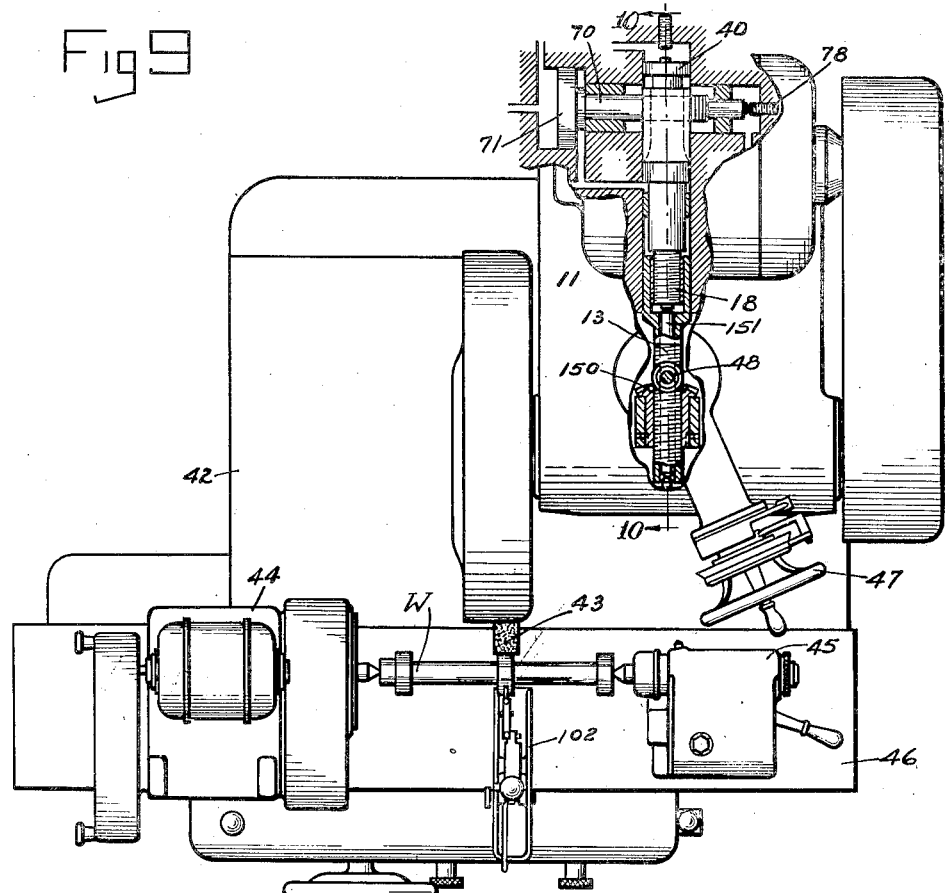
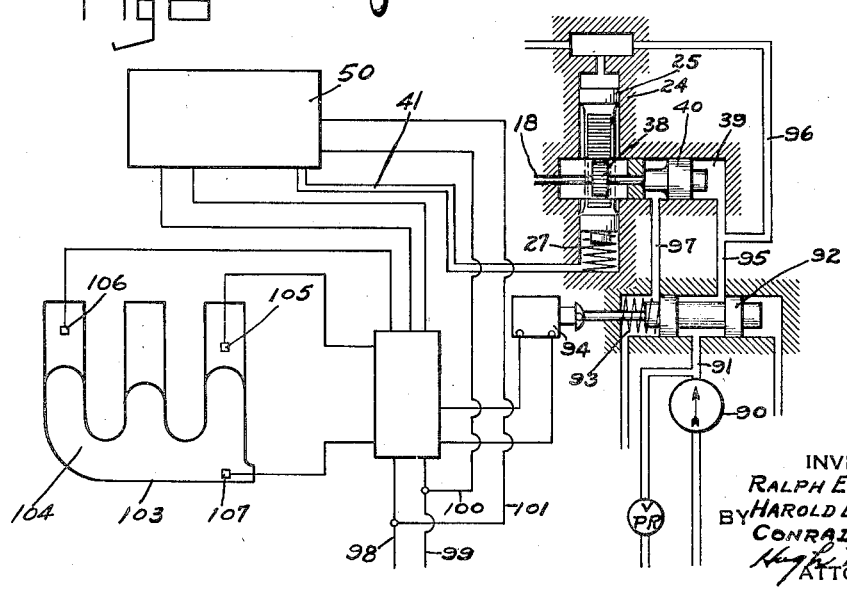

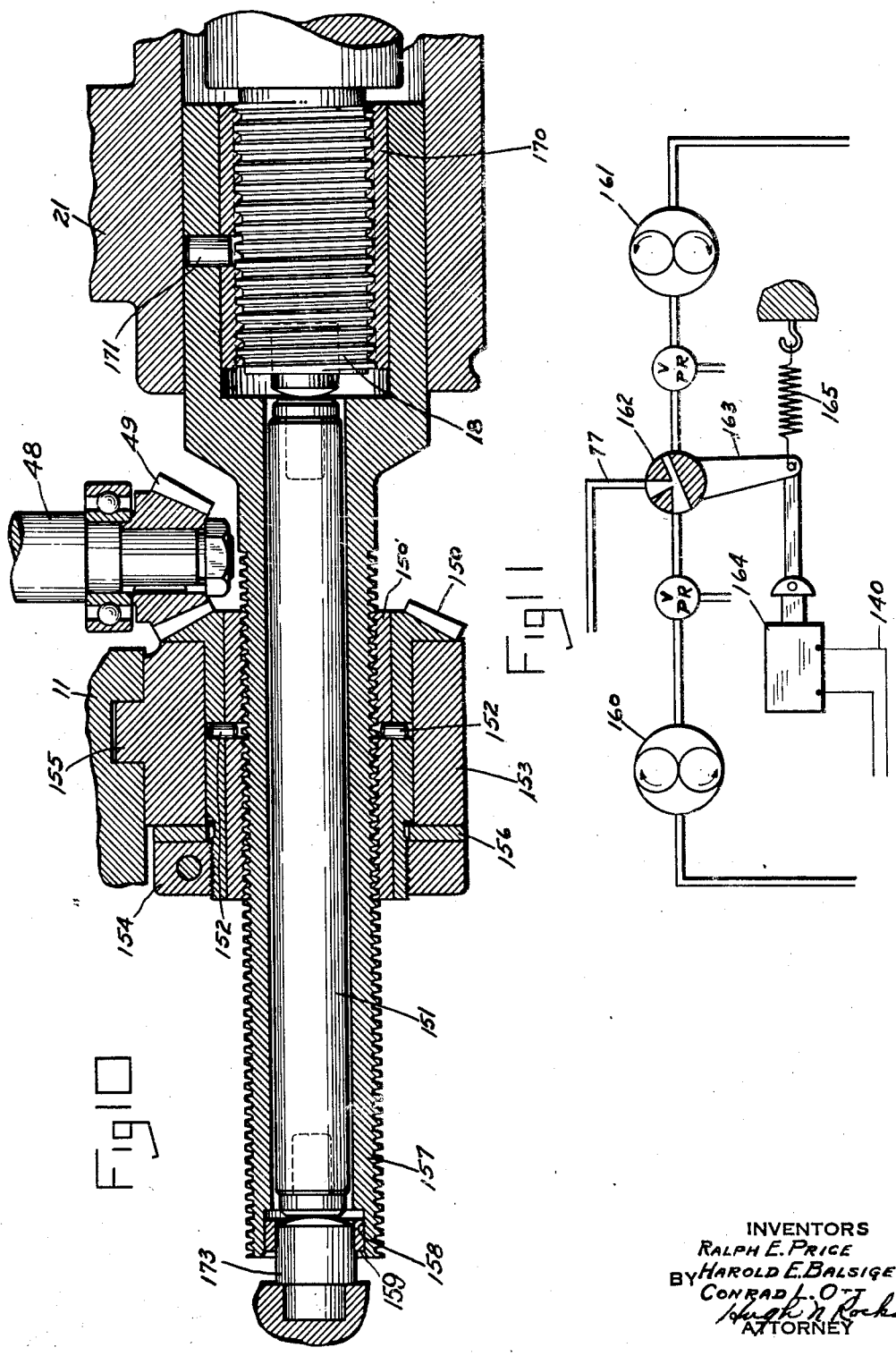

UNITED STATES PATENT OFFICE

2,150,749

FEED MECHANISM

Ralph E. Price, Harold E. Balsiger, and Conrad L. Ott, Waynesboro, Pa., assignors to Landis Tool Company, Waynesboro, Pa., a corporation Application August 6, 1936, Serial No. 94,704

15 Claims. (Cl. 51—165)

Our invention relates to a wheel feeding mechanism for a grinding machine and it is an object of the same to provide means whereby an extremely accurate feeding movement may be obtained.

A further object is to provide two interlocking feeding mechanisms, one for effecting a rapid positioning movement of a tool support, the other for effecting a feeding movement of said support.

A further object is to provide screw means for causing the feeding movement for the wheel support and additional screw means for varying the zone of movement of said wheel support.

A further object is to provide means to vary the rate of movement of said feed screw.

A further object is to provide control means for said feed mechanism responsive to variation in size of a work piece.

A further object is to provide novel means controlled by said sizing device for varying the rate of feed of said mechanism.

In the drawings Figure 1 is a sectional end elevation of the wheel support showing the arrangement of the feed mechanism.

Figure 2 is a cross section taken along the line 2—2 of Figure 1.

Figure 3 is an optional construction with piston as shown in Figure 2.

Figure 4 is a plan view of the feed control mechanism broken away to show the location of the heating element.

Figure 5 is a sectional front elevation of the structure shown in Figure 4.

Figure 6 is a cross section similar to Figure 2 and showing an optional construction of the structure shown in Figure 2.

Figure 7 is a diagrammatic wiring and piping arrangement used in connection with the structure disclosed in Figure 6.

Figure 8 is a wiring and piping diagram for the feed mechanism disclosed in Figure 2.

Figure 9 is a plan view of a grinding machine with the wheel support broken away to show the method of mounting the feed mechanism.

Figure 10 is a partial section on line 10—10 of Figure 9.

Figure 11 is a diagrammatic view of an optional pump arrangement.

Our invention is designed for so-called plunge cut grinding; that is, the length of the surface to be ground is approximately the same as the width of the grinding wheel. There is no traverse movement in the sense that the work and wheel are moved relatively axially in order that the work may be ground from one end to the other. There may be, however, a slight relative reciprocating movement between the work and the wheel, the function of which is to break up the grinding line, on the work.

Where there is a traversing movement between the work and the wheel, the question of providing an automatic feeding movement is comparatively simple. The traversing movement is utilized to actuate the feeding mechanism. The wheel may be positioned rapidly by hand or by power after which grinding feed occurs automatically at each reversal of the traverse movement, thru the medium of a pawl and ratchet mechanism actuated by the carriage movement or by the reversing mechanism.

In plunge cut grinding the best results are obtained when the feeding movement is continuous. Such a movement is not possible where the feed depends for its actuation upon the reciprocating movement of one of the parts.

There are a number of different methods for providing a continuous feeding movement.

1. Checking the rapid positioning movement and reducing same to a grinding movement by:
   (a) A dashpot mechanism.
   (b) A throttle valve in either the exhaust or pressure lines in the feed motor, the throttle valve being automatically actuated at the proper time.
2. A piston acting thru a rack and pinion for rotating a feed screw, with no provision for a power operated rapid positioning movement. This method is satisfactory where it is necessary to back the wheel off a very small distance, but of little use for work such as crankshafts where the back off movement must be several inches.

Our invention makes use of the well known piston and cylinder mechanism for moving the grinding wheel rapidly toward and from the work. When the wheel has been positioned adjacent the work for the start of a grinding operation the function of the rapid feed piston has been completed. The feeding movement is effected by another fluid motor acting thru a rack and pinion or other suitable mechanisms to rotate the feed screw or the nut continuously in one direction and thus impart a feeding movement to the grinding wheel which continues until the work piece has been ground to size. At this point in the grinding operation the rapid feed piston may be reversed either automatically or manually to separate the wheel and the work to stop the grinding operation. At the same time the feed piston will be reversed or reset in order to place the grinding wheel in position for the next grinding operation.

In Figure 1 numeral 10 indicates a wheel support mounted to slide axially on a bed portion 42. A wheel base 11 is slidably mounted on the support 10, for movement transversely thereof. A grinding wheel and spindle may be mounted in a bracket 12, which in turn is secured to the wheel base 11. The wheel base 11 may be moved toward and from a work piece manually by means of a feed screw 13 and a hand wheel 14. Feed screw 13 passes through a nut 15 supported in a bracket 16 which is attached to a wheel base by means of screw 17. The mechanism for moving the wheel base toward and from the work by power consists of a second feed screw 18, mounted in a split nut 19. Said nut in turn is mounted within a sleeve 20, said sleeve is slidably mounted in a bracket 21 and has a key 22, which fits in keyway 23 of said bracket to prevent rotation of the sleeve therein. Said bracket is secured to the wheel support 10. A portion 24 of said bracket forms a cylinder on which is slidably mounted an elongated piston 25, a portion of the upper part of said piston is in the form of a rack, the lower portion of said piston is slotted thru a portion of its length so that a pin 26 in cylinder 24 may be inserted therein to prevent rotation of said piston. Said piston is hollowed out to receive a spring 27, one end of which is secured to the end of the piston, the other to a cover portion 28 on the cylinder 24. Said cover portion 28 has formed therein a pressure operated valve consisting of a piston 29 having a pair of lands 30 and 31. Said piston has an axial bore which extends part way into land 31 and has a ball 32 mounted therein to form a check valve. Radial passage 33 opens into the valve chamber from said axial bore in the space between the two lands. Said valve is held normally in the closed position shown by a spring 34. Fluid under pressure after opening said valve may enter the cylinder 24 thru port 35 and upon release of the pressure on said fluid it may pass out of the cylinder thru the port 36 into the space occupied by the spring 34, and from there thru exhaust line 37 to the reservoir. A rapid reset movement of piston 25 is effected by permitting fluid to exhaust thru check valve 32.

The rack teeth in said piston engage a pinion 38 which forms one end of screw 18. Thus movement of the piston becomes effective to rotate screw 18 and thereby causes a feeding movement of the wheel support toward and from a work piece. Attached to bracket 21 is a cylinder 39 on which is mounted a piston 40 having a piston rod in axial alignment with and secured to pinion 38. Fluid pressure exerted against either side of said piston is effective to move the feed screw 18 axially to cause a rapid positioning movement of the wheel base.

Movement of the piston 25 during feeding is controlled by causing the fluid which is exhausted during this stroke to pass thru passage 41 to the mechanism disclosed in Figures 4 and 5. This mechanism consists of a housing 50 which is divided into two compartments 51 and 52 by a wall 53. Passage 41 leads into compartment 51 which acts as a reservoir. Fluid from passage 41 must pass thru check valve 41' and the needle valve 54 in valve body 54'. The rate at which said fluid passes thru said valve is determined by the setting of the valve. A spring 55 acts to hold said valve in open position. A lever 56 pivoted at 57 serves to close the valve 54. An adjusting screw 58 mounted in said lever close to the pivot point engages one end of said valve and determines the amount of closing thereof. Said lever 56 extends horizontally into the compartment 52 where it is connected thru a spring 59 and link 60 to the solenoid 61. Upward movement of said lever is limited by the adjusting screw 62. Said screw thus determines the maximum grinding feed. A second adjusting screw 63 passes thru the lever 56. The lower end of said screw has a head 66 which acts as a stop to the downward movement of said lever and it determines the rate of the slow feed.

The fluid in the reservoir 51 is maintained at an even temperature by means of a heating element 64 controlled by thermostat switch 65. Said heating element receives a supply of current from lines 98 and 99 thru lines 100 and 101. The purpose of this arrangement is to prevent variation in flow of fluid thru the valve 54 due to variation in temperature of said fluid. This is an improvement in that the valve setting remains constant and the temperature of the fluid approximately constant. It is desirable to heat the fluid because heat is generated by the various working parts, and in order to maintain as near a uniform temperature as possible in the machine as well as in the fluid, sufficient heat should be added to cause the temperature of the fluid and the machine to approach that of the hottest part.

In Figure 3 is shown an optional design for piston 25 of Figure 2. In this case the end of piston 25 is extended but considerably reduced in diameter. Numeral 160 indicates this extended portion. A piston 161 is mounted on this extension and is free to move thereon thru a limited range which is determined by the head of screw 162 in the end of said extended portion. This construction permits a certain amount of lost motion between piston 25 and piston 161 equal to the total lost motion in the other elements of the feed mechanism. This construction is effective to cause the slow down of piston 25 and the start of the grinding feed to occur simultaneously.

The mechanism for controlling the feed mechanism shown in Figs. 1 and 2, is shown diagrammatically in Fig. 8. Fluid under pressure is supplied by a pump 90 thru line 91 to a reversing valve 92. Said valve is actuated in one direction by a spring 93 and in the other directions by a solenoid 94. In the normal position of the valve; that is, with the solenoid deenergized, fluid under pressure is directed thru line 95 and a branch line 96 to cylinders 39 and 24 respectively to feed the grinding wheel toward the work. Piston 40 acts to move the wheel rapidly until the piston stops at the end of the cylinder. Piston 25 continues to move and the feeding movement proceeds by rotation of screw 18. The rate of movement of piston 25 is controlled by the setting of valve 54 thru which fluid from line 41 and the end of cylinder 24 must pass. As the size of the work changes the setting of valve 54 is changed by solenoid 61 and the feeding movement continues at a different rate.

When the work has been ground to size, solenoid 94 is energized by the sizing device to shift valve 92 to the left and direct fluid thru line 97 to shift piston 40 and hence the wheel support to the right to back the wheel away from the work. At the same time fluid under pressure in cylinder 24 is released and spring 27 causes feed piston 25 to be reset.

The sizing devices mentioned herein are similar to those disclosed in Balsiger Patents 2,019,066 granted October 29, 1935, for Automatic sizing devices, and 2,001,447 granted May 14, 1935, for Automatic control mechanism, and consist of a caliper 102 for engaging the work piece, a manometer tube 103 containing a body of mercury or other electrically conductive fluid 104 and spaced contacts 105 and 106 for completing electric circuits at predetermined intervals when engaged by the mercury as it rises in the tube. A common line 107 serves for both contacts 105 and 106. When mercury touches the contact 105, solenoid 61 is energized and the feeding movement slowed down for finishing. When the mercury touches contact 106, solenoid 94 is energized and the grinding wheel is backed away from the work.

In Figs. 6 and 7 is shown another form of our invention. In this case the rapid feed mechanism is the same as that described in the first form of our invention. The slow feed structure however differs in this respect, that pinion 80 which rotates screw 18, instead of meshing with a rack formed on a single acting piston, it engages a rack formed on a piston rod 70 of a double acting piston 71. Said piston rod is slidably mounted in sleeves 72 and 73 in a housing 74. The cylinder 75 containing said piston 71 is attached to one end of said housing. Ports 76 and 77 provide for the admission of fluid under pressure to either side of said piston. A cap 81 secured to the other end of said housing carries an adjustable stop 78, in axial alignment with a hardened screw 79 in the end of piston rod 70.

The method of operating this feed also differs from that disclosed above and is shown here diagrammatically. In this case the rate of movement of the slow feed piston 71 is controlled by varying the supply of fluid thereto and this is accomplished by means of a differential pump arrangement.

This arrangement consists of two pumps 120 and 121 arranged in series. The capacity of pump 121 is slightly less than that of pump 120. The combined discharge of the two pumps passes thru lines 125 and 122, solenoid valve 123, and line 77, thru port 77 to cylinder 75 to operate the feeding mechanism at a roughing speed. Valve 123 is actuated in one direction by solenoid 124 and arm 124' and in the other direction by spring 123'. When valve 123 is closed pump 121 takes as much of the discharge of pump 120 as its capacity will allow and forces it thru a relief valve back to the reservoir. The remainder passes thru line 125 to line 77 and cylinder 75 to operate the feeding mechanism at a very slow finishing speed. Fluid under pressure for the rapid feed and back off movements is supplied from pump 126 thru reversing valve 127. Said reversing valve is actuated in one direction by fluid under pressure from a pilot valve 128 and in the opposite direction by a spring 129. The pilot valve is actuated by a solenoid 130 against a spring 131. In the position shown, valve 127 supplied fluid under pressure thru line 132 to piston 40 and piston 71. In the other position fluid under pressure is supplied only to the other end of piston 40 thru line 133. An exhaust line 134 from the head end of cylinder 75 has a relief valve inserted therein to maintain pressure in said cylinder during the slow feed movement and to allow a quick reset.

An optional pumping arrangement is shown in Fig. 11. This arrangement consists of a comparatively small volume pump 160 and a comparatively large volume pump 161, both pumps are connected thru valve 162 and line 77 to feed cylinder 75. Valve 162 is actuated by a lever 163 connected to solenoid 164 which may be substituted for the corresponding elements in Fig. 7.

In the position shown the sizing device has actuated relay 144 to deenergize solenoid 164 and permit spring 165 to shift valve 162 to cut out pump 161 and leave only the small volume pump 160 to supply fluid under pressure to cylinder 75 thus providing a very slow movement of the feed mechanism. When the sizing device contacts have been opened by removing the work, the relays 144 and 145 are deenergized and the upper set of contacts closed. In the case of relay 144 a circuit is closed to supply current to solenoid 164. Solenoid 164 then shifts valve 162 so that fluid under pressure from both pumps is supplied thru line 77 to cylinder 75 to actuate the feeding mechanism at a speed suitable for rough grinding.

The feed pumps described herein are of the constant volume type. No throttle valves are used to obtain a variation in rate of flow. Instead, various combinations of pumps provide the necessary speed changes. The reason for this is that variation in temperature has little or no effect on the pump volume while flow thru a throttle valve may vary considerably with temperature change in the fluid.

Current is supplied to the solenoids 124 and 130 thru lines 140 and 141 which also supply headstock motor 142. This supply of current is controlled by switch 143 in line 141. The current to the solenoids must pass thru relays 144 and 145 and these are controlled by sizing device contacts 106 and 105 respectively. In the position shown current may pass from the supply line thru the relays to the solenoids as soon as switch 143 is closed.

In the operation of our invention the operator closes switch 143 to start the headstock motor and at the same time current passes thru the lower contacts of relay 145 to energize solenoid 130. Said solenoid shifts valve 128 thru which fluid from the end of valve 127 may be permitted to escape thru exhaust line 147. Spring 129 may then shift said valve to the left to direct fluid under pressure thru line 133 to the end of rapid feed piston 40 to shift the wheel support rapidly to grinding position. At the same time current passes thru the lower contacts of relay 144 to energize solenoid 124 and open valve 123. The full discharge of pumps 120 and 121 is thus made available to shift piston 71 to rotate feed screw 18.

When a work piece has been rough ground to a predetermined size the mercury 104 engages contact 106 to energize relay 144. This causes the circuit thru the lower contacts to be broken. The circuit closed thru the upper contacts at this time is merely a holding circuit. Breaking the circuit thru said lower contacts deenergizes solenoid 124 and permits spring 123' to close valve 123. Fluid from pump 121 must then be discharged to the reservoir thru the relief valve. The remaining fluid which is the difference between the capacities of the two pumps passes thru lines 125 and 77 to piston 71 to continue the feeding movement at a very much reduced rate.

When the work has been ground to size contact 105 is closed and relay 145 energized to open the circuit thru its lower contacts thus deenergizing solenoid 130 and permitting valve 128 to be shifted upwardly by spring 131. In this position of said valve fluid is directed to shift valve 127 to the right and direct fluid to the rod end of pistons 40 and 71. Piston 40 is shifted to cause a rapid withdrawal of the grinding wheel from the work, and piston 71 is shifted to reset the slow feed mechanism. Said piston 71 is reset against the pressure of the feed pumps, the exhaust passing to the reservoir thru a relief valve in line 134.

In Figure 9 is shown a plan view of a grinding machine of conventional design with the wheel base broken away to show the arrangement of this type of feed mechanism with relation to the machine. The type of feed shown here is slightly different from that disclosed in Figures 6 and 7. The type shown in Figs. 1, 2, and 8 is attached to a machine in the same manner, the principle difference being that in the latter case, the hand wheel is attached direct to said screw thru a succession of shafts and bevel gears.

In Figure 9, the wheel base 11 is slidably mounted on a bed 42. Said wheel base carries a grinding wheel 43. A work piece $w$ is mounted on centers between a head stock 44 and a foot stock 45 on a carriage 46. The carriage is slidably mounted on said bed to move in a direction transversely of the movement of the wheel base. Hand wheel 47 acts thru a shaft and bevel gears not shown to rotate a vertical shaft 48 on which is mounted a bevel gear 49. Gear 49 engages another bevel gear 150 on a nut 150' thru which passes a screw 157. As shown in Figure 10 said nut consists of a threaded sleeve mounted within the bore of gear 150 and secured therein by any suitable means such as pins 152. The connection between the bevel gear and the wheel support is a collar 153 held on said gear by a nut 154. A projection on said collar is inserted in a notch in the wheel support 11. A washer 156 is inserted between nut 154 and collar 153. Screw 157 is hollow. One end is counterbored at 158 and has a ring 159 inserted therein. Said ring acts as a guide and bearing for stationary stop 173, which is mounted in the bed. The other end of said screw is enlarged and slidably mounted in bracket 21. Said enlarged end is also counterbored to receive a threaded sleeve 170. A pin 171 prevents movement of said sleeve in said bore. Screw 18 is threaded into sleeve 170 and whether said screw is moved axially or rotated the movement is effective to cause an axial movement of screw 157 which in turn acts thru collar 153 to move wheel support 11. A stop bar 151 is slidably mounted in screw 157 and provides a solid connection between stop 173 and the stop button in the end of screw 18 during the grinding feed. At the end of the rapid feed movement all of said stop elements are in engagement. As screw 18 is rotated in a fixed axial position, screw 157 is caused to move axially carrying with it the wheel support 11.

We claim:

1. A grinding machine comprising a tool support, a fluid motor for providing a rapid positioning movement of said support, a second fluid motor for moving said support at a slow feeding speed, a source of fluid under pressure for said second motor comprising a plurality of pumps, a sizing device and means responsive to a change in size of a work piece for automatically varying the number of pumps supplying fluid under pressure thereto whereby to vary the rate of said feeding movement.

2. A grinding machine comprising a tool support, a fluid motor for providing a rapid positioning movement of said support, a second fluid motor for moving said support at a slow feeding speed, a source of fluid under pressure for said second motor comprising a plurality of pumps of slightly varying capacities arranged in series so that the smaller pumps from the larger pump to the motor to the limit of its capacity, the remaining fluid passing to said motor direct, means for automatically diverting the discharge of said smaller pump away from said motor whereby the only fluid supplied thereto is the small amount which is the difference between the capacities of the pumps.

3. A grinding machine comprising a tool support, a fluid motor for providing a rapid positioning movement of said support, a second fluid motor for moving said support at a slow feeding speed, a source of fluid under pressure for said second motor comprising a plurality of pumps of widely varying capacities arranged in parallel so that each pump discharges independently into a common line leading to the motor, a sizing device and automatic means responsive to a change in size of a work piece for diverting the discharge of the larger pump whereby to reduce the rate of feed of said support.

4. In a grinding machine, a work support, a grinding wheel support, mechanism for effecting a feeding movement between said supports comprising a feed screw and nut, means for rotating one of said parts continuously during a grinding operation comprising a motor, means for retarding movement of said motor, and a lost motion device for permitting elimination of back lash between said motor and said feed mechanism before said retarding means becomes effective.

5. In a grinding machine, a work support, a grinding wheel support, mechanism for effecting a feeding movement between said supports comprising a feed screw and nut, means for rotating one of said parts continuously during a grinding operation comprising a motor, connections between said motor and said feed mechanism, means for retarding the movement of said motor during a grinding operation, and means for providing a lost motion between said motor and said retarding means in proportion to the back lash in said connections and said feed mechanism.

6. In a grinding machine, a work support, a grinding wheel support, mechanism for effecting a feeding movement between said supports comprising a feed screw and nut, means for rotating one of said parts continuously during a grinding operation comprising a pinion attached to one of said parts, a rack in operative engagement with said pinion, a motor comprising a piston and cylinder for shifting said rack, means for resisting the flow of fluid from said cylinder during a grinding operation, a secondary piston having a lost motion in connection with said first piston whereby the first piston may move rapidly to take up the back lash in said feed mechanism before movement of said piston is retarded.

7. In a grinding machine having a grinding wheel, a support therefor, a work support, mechanism for effecting a feeding movement between said parts comprising a fluid motor, fluid means for retarding movement of said motor comprising a body of fluid movable in response to said feeding movement, a valve for regulating the movement of said body of fluid, and a thermostatically controlled heating element for maintaining a fluid temperature greater than the maximum room temperature, whereby to control the viscosity of the fluid.

8. In a grinding machine, a grinding wheel support, a work support, mechanism for effecting a relative transverse movement between said supports comprising a feed screw and nut, one of which is attached to said support, a fluid motor for effecting a rapid axial movement of said parts for moving said wheel support toward and from operative position, a second fluid motor for effecting a relative angular movement between said nut and said screw, a supply of fluid under pressure to move said second fluid motor in one direction, a second pump for supplying fluid under pressure to move said second motor in the opposite direction, and said first motor in both directions.

9. In a grinding machine, a wheel support, a work support, means for effecting a relative transverse movement between said supports comprising a screw and nut, fluid pressure means for moving said screw and nut axially to effect said transverse movement at a rapid rate, a pump for supplying fluid under pressure to said means, other fluid pressure means for rotating one of said parts to effect said transverse movement at a slow feeding rate, an unrestricted supply of fluid under pressure connected to said second fluid pressure means for moving same only in one direction and connections from said pump to said second fluid means for moving same in the opposite direction against the force exerted by said unrestricted supply of fluid under pressure.

10. In a grinding machine, a work support, a tool support, means for causing a relative transverse movement of said supports toward and from operative position comprising a feed screw and nut, fluid operated mechanism for moving said screw and nut axially for rapidly placing said supports in operative relation, fluid operated mechanism for rotating one of said parts for causing a slow feeding movement between said supports, means for automatically supplying fluid under pressure to said rapidly moving means at a predetermined stage in the grinding operation for separating said supports and means for simultaneously directing fluid under pressure to said second fluid operated mechanism for resetting same for another grinding operation.

11. A feed mechanism for a grinding wheel support comprising a feed screw, a nut, manual means for rotating said nut, a second nut integral with said feed screw, a second screw in operative engagement with said second nut and power means for rotating said second screw.

12. A feed mechanism for a grinding wheel support comprising a feed screw, a nut, manual means for rotating said nut, a second nut integral with said feed screw, a second screw in operative engagement with said second nut, power means for rotating said second screw and additional power means for shifting both of said screws and nuts bodily and axially.

13. A grinding machine having a tool support, a fluid motor for moving said support at a slow feeding speed, a source of fluid under pressure for said motor comprising a plurality of pumps, a sizing device and means responsive to a change in size of a work piece for automatically varying the number of pumps supplying fluid under pressure thereto, whereby to vary the rate of said feeding movement.

14. A grinding machine having a tool support, a fluid motor for moving said support at a slow feeding speed, a source of fluid under pressure for said motor comprising a plurality of pumps of slightly varying capacities arranged in series so that the smaller pump pumps from the larger pump to the motor to the limit of its capacity, the remaining fluid passing to said motor direct, means for automatically diverting the discharge of said smaller pump away from said motor whereby the only fluid supplied thereto is the small amount which is the difference between the capacities of the pumps.

15. A grinding machine having a tool support, a fluid motor for moving said support at a slow feeding speed, a source of fluid under pressure for said motor comprising a plurality of pumps of widely varying capacities arranged in parallel so that each pump discharges independently into a common line leading to the motor, a sizing device responsive to change in size of a work piece and automatic means for diverting the discharge of the larger pump whereby to reduce the rate of feed of said support.

RALPH E. PRICE.
HAROLD E. BALSIGER.
CONRAD L. OTT.